United States Patent [19]
Wohlfarth

[11] Patent Number: 4,488,518
[45] Date of Patent: Dec. 18, 1984

[54] ENGINE COOLING DEVICE

[75] Inventor: Peter Wohlfarth, Ludwigsburg, Fed. Rep. of Germany

[73] Assignee: Daimler-Benz Aktiengesellschaft, Stuttgart, Fed. Rep. of Germany

[21] Appl. No.: 465,253

[22] Filed: Feb. 9, 1983

[30] Foreign Application Priority Data

Feb. 11, 1982 [DE] Fed. Rep. of Germany ....... 3204790

[51] Int. Cl.³ .............................................. F01B 5/06
[52] U.S. Cl. .................................. 123/41.49; 180/68.1
[58] Field of Search .............. 123/41.49, 41.65, 41.66, 123/41.57; 180/54 A, 68.4, 68.6; 296/188

[56] References Cited

U.S. PATENT DOCUMENTS 3,428,141 2/1969 Forstner et al. ..................... 165/166
4,116,171 9/1978 Schulmeister et al. .......... 123/41.49

FOREIGN PATENT DOCUMENTS 1191160 10/1959 France .............................. 123/41.49

Primary Examiner—William A. Cuchlinski, Jr.
Attorney, Agent, or Firm—Barnes & Thornburg

[57] ABSTRACT

An air cooling device is provided for a liquid-cooled internal-combustion engine for use in an armoured vehicle or the like. An air-stream is conveyed by a fan and flows through an external vehicle wall orifice which is covered by an annular-gap grating. To achieve a favorable utilization of space and good accessibility to the fan drive, while maintaining critical operating components secure against external bombardments, the fan and an air guide body are disposed and supported within the annular-gap grating.

8 Claims, 1 Drawing Figure

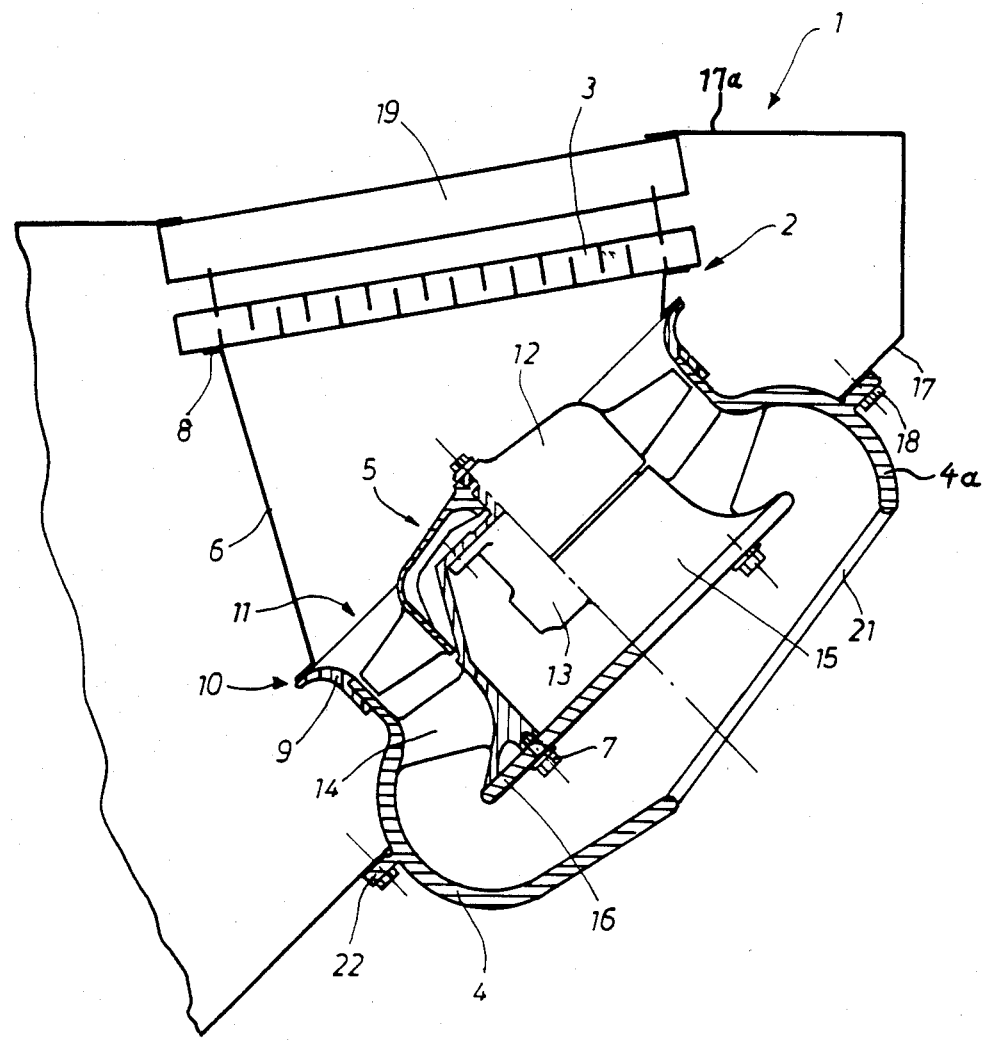

ENGINE COOLING DEVICE

BACKGROUND AND SUMMARY OF THE INVENTION

The invention relates to a cooling device, especially for a liquid-cooled internal-combustion engine for use in an armoured vehicle with an annular-gap grating at a wall of the vehicle and a fan inside of the vehicle upstream of the grating.

A cooling device for liquid-cooled internal-combustion engines with fuel cooling is known from German patent Specification No. 2,462,475. In this arrangement the air-stream of a radial fan is guided through an annular-gap grating, that is to say an annular air-guiding labyrinth, which is fastened to the vehicle wall. At the same time, the annular-gap grating and the radial fan are connected to one another by means of a flexible line portion. This cooling device has too high a space requirement for use in an armoured vehicle, and it is possible to gain access to the fan motor only by means of partial dismantling of adjacent components.

Furthermore, German Offenlegungsschrift (published, unexamined application) No. 1,455,760 makes known, in an armoured vehicle, a cooling device with a cooling-air channel in which is inserted an air guide body which is supported on air guide blades and which contains the drive of the fan. The cooling-air channel is closed by means of a bar grating. At the same time, however, because the cooling device is located behind the bar grating a considerable construction space is required.

An object of the invention is to arrange the cooling device in a space-saving manner, while ensuring good accessibility to the fan.

This object is achieved according to the invention by means of disposing and intergrally supporting the fan and the air guide body at the annular-gap grating. In a particularly preferred embodiment, the fan motor is intergrated into the annular-gap grating. In this preferred embodiment, a releasable cover for the air guide body is also provided. The annular-gap grating itself is preferably fastened from the outside to the vehicle wall to facilitate removal and access to the fan and fan driving components.

The cooling device according to the invention has the best possible utilisation of the construction space because the air guide blades, the air guide body and the fan are integrated in the annular-gap grating. it is also possible to assemble the annular-gap grating together with the fan from outside and to provide accessibility to the fan drive motor with the preferred construction of the invention.

These and further objects, features and advantages of the present invention will become more obvious from the following description when taken in connection with the accompanying drawing which shows, for purposes of illustration only, a single embodiment in accordance with the present invention.

BRIEF DESCRIPTION OF THE DRAWING

An exemplary embodiment of the invention is illustrated in the single drawing FIGURE, which is a diagrammatic partial section through the rear of an armoured vehicle containing the inventive cooling device arrangement.

DETAILED DESCRIPTION OF THE DRAWING

In a vehicle rear portion 1 of an armoured vehicle, a cooling device 2 is provided which comprises a heat-exchanger 3 and a fan 5, preferably an axial fan, intergrated in an annular-gap grating 4. The annular-gap grating 4 is an annular air-guiding labyrinth and consists of an outer housing 4a and a cover 16 which are designed and arranged in relation to one another so that, starting from an air inlet orifice 11, no passage along a straight line to an air outflow orifice is possible. An air channel 6 is attached, by means of flexible gaskets 8, 9, on the one hand to the heat-exchanger 3 and on the other hand in the region 10 of the air inlet orifice 11 of the housing 4a of the annular-gap grating.

Intergrated in the annular-gap grating 4, in addition to the fan 5 comprising a fan wheel 12 and a fan drive motor 13, is an air guide body 15 which is carried by air guide blades 14. The air guide body 15, which receives the fan drive motor 13, is closed by means of the cover 16 designed as a bombardment-proof plate and releasable by means of screws 7. The housing 4a of the annular-gap grating is fastened releasably, for example by means of screw connections, from outside to a vehicle wall 17 via a flange 22. Air inflow takes place through an orifice 19 in the vehicle wall section 17a and air outflow takes place through an outflow orifice 21 in the housing 4a of the annular-gap grating.

The air sucked in by the fan 5 flows through the orifice 19 in the vehicle wall section 17a and through the heat-exchanger 3 into the air channel 6 and is guided by the air guide blades 14 and the air guide body 15 through the annular-gap grating 4 to its air outflow orifice 21.

The fan drive 13 of the fan wheel 12 takes place preferably by means of a hydraulic motor; however, an electric motor or a mechanical fan drive can also be used according to other contemplated embodiments of the invention.

While I have shown and described the embodiment in accordance with the present invention, it is understood that the same is not limited thereto but is susceptible to numerous changes and modifications as would be known to those skilled in the art of the present disclosure and I therefore do not wish to be limited to the details shown and described therein but intend to cover all such changes and modifications as are encompassed by the scope of the appended claims.

I claim:

1. A cooling device, especially for a liquid-cooled internal-combustion engine of an armoured vehicle or the like comprising:
    an annular-gap grating arranged at a vehicle wall,
    a fan for conveying air outwardly of the vehicle through the grating,
    air guide body means for guiding the flow of air, and
    air guide support blade means for supporting the air guide body means, wherein said fan, said air guide body means, and said air guide support blade means are supported by and disposed radially inside of and within the axial extent of the annular-gap grating.

2. Cooling device according to claim 1, wherein a fan drive motor for driving the fan is intergrated in the air guide body means.

3. Cooling device according to claim 1, wherein the air guide body means is closed by means of a releasable cover.

4. Cooling device according to claim 2, wherein the air guide body means is closed by means of releasable cover.

5. Cooling device according to claim 2, wherein the annular-gap grating is fastened from outside to the vehicle wall.

6. Cooling device according to claim 3, wherein the annular-gap grating is fastened from outside to the vehicle wall.

7. Cooling device according to claim 1, wherein the annular-gap grating is fastened from outside to the vehicle wall.

8. A cooling device, especially for a liquid-cooled internal-combustion engine of an armoured vehicle or the like comprising:

an annular-gap grating arranged at a vehicle wall, a fan for conveying air outwardly of the vehicle through the grating, air guide body means for guiding the flow of air, and air guide support blade means for supporting the air guide body means, wherein said fan, said air guide body means, and said air guide support blade means are supported at the annular-gap grating, wherein the air guide body means supports the fan and includes a bombardment-resistant detachable cover at the downstream end thereof, and wherein the air guide support blade means extend from an inside wall surface of the annular-gap grating and are attached at the housing of the air guide body means at a position upstream of the cover for the air guide body means, said cover and air guide body means being disposed radially inside of the annular-gap grating.

* * * * *